C. G. KOPPITZ.
APPARATUS FOR INTERCONVERTING HIGH POTENTIAL POLYPHASE AND DIRECT ELECTRIC CURRENTS.
APPLICATION FILED AUG. 31, 1911.
1,183,881.
Patented May 23, 1916.
3 SHEETS—SHEET 1.
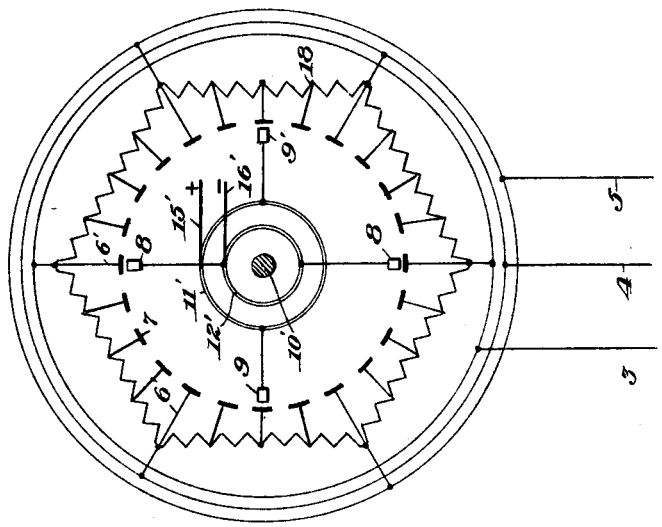
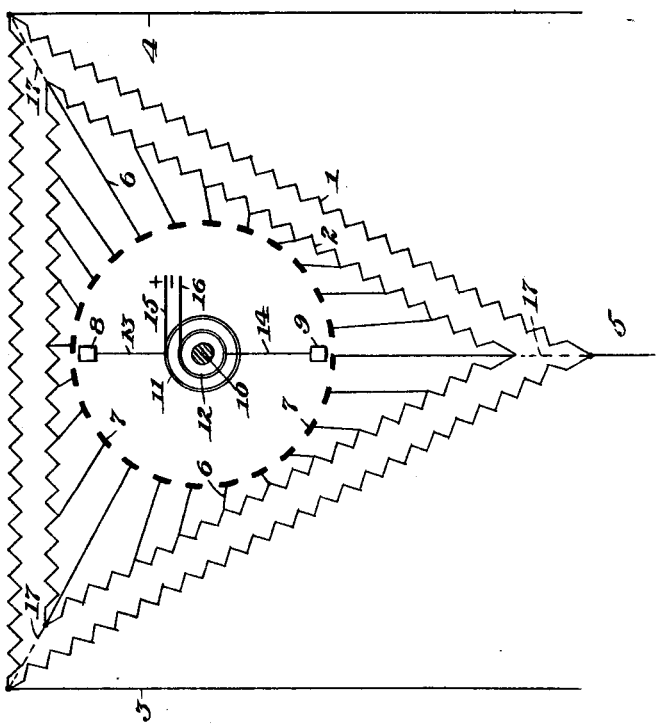

C. G. KOPPITZ.
APPARATUS FOR INTERCONVERTING HIGH POTENTIAL POLYPHASE AND DIRECT ELECTRIC CURRENTS.
APPLICATION FILED AUG. 31, 1911.
1,183,881.
Patented May 23, 1916.
3 SHEETS—SHEET 2.
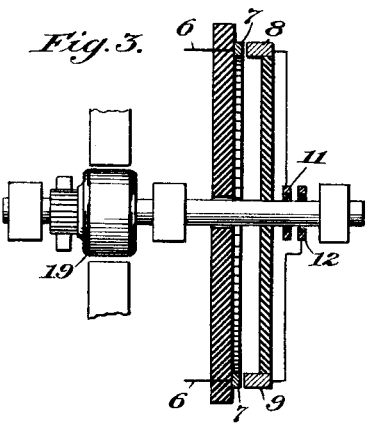
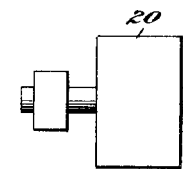
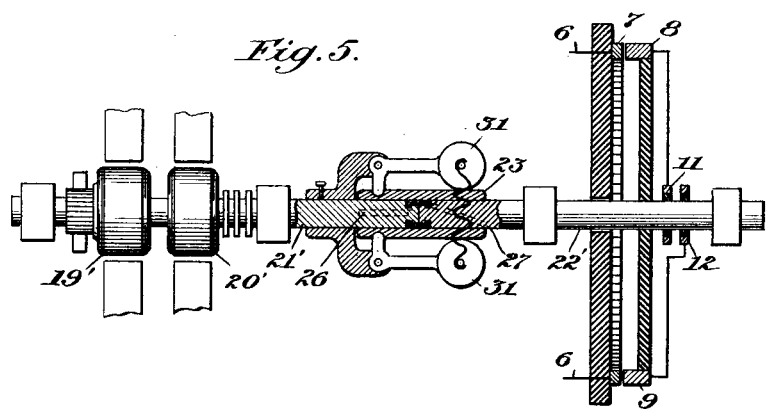
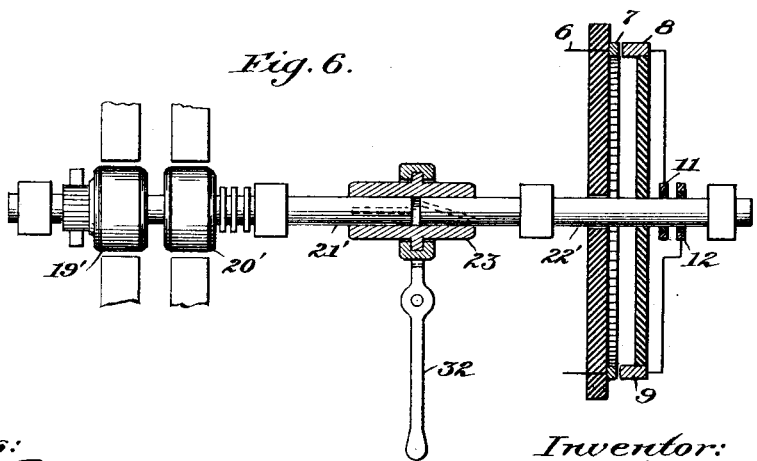

C. G. KOPPITZ.
APPARATUS FOR INTERCONVERTING HIGH POTENTIAL POLYPHASE AND DIRECT ELECTRIC CURRENTS.
APPLICATION FILED AUG. 31, 1911.
1,183,881.
Patented May 23, 1916.
3 SHEETS—SHEET 3.
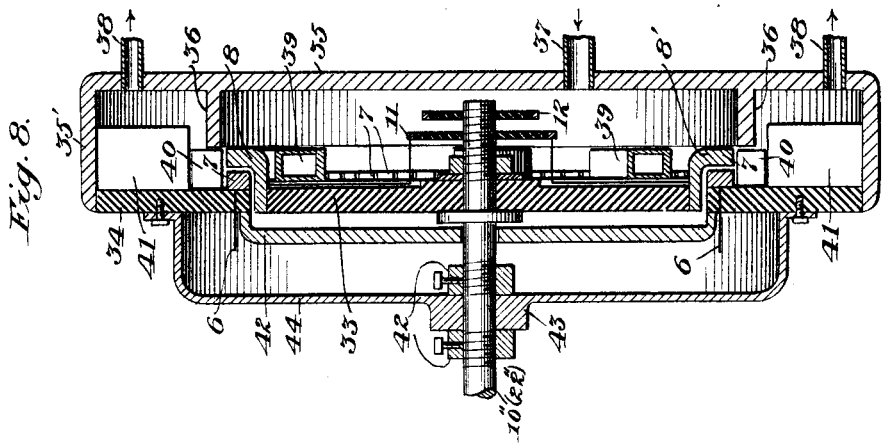
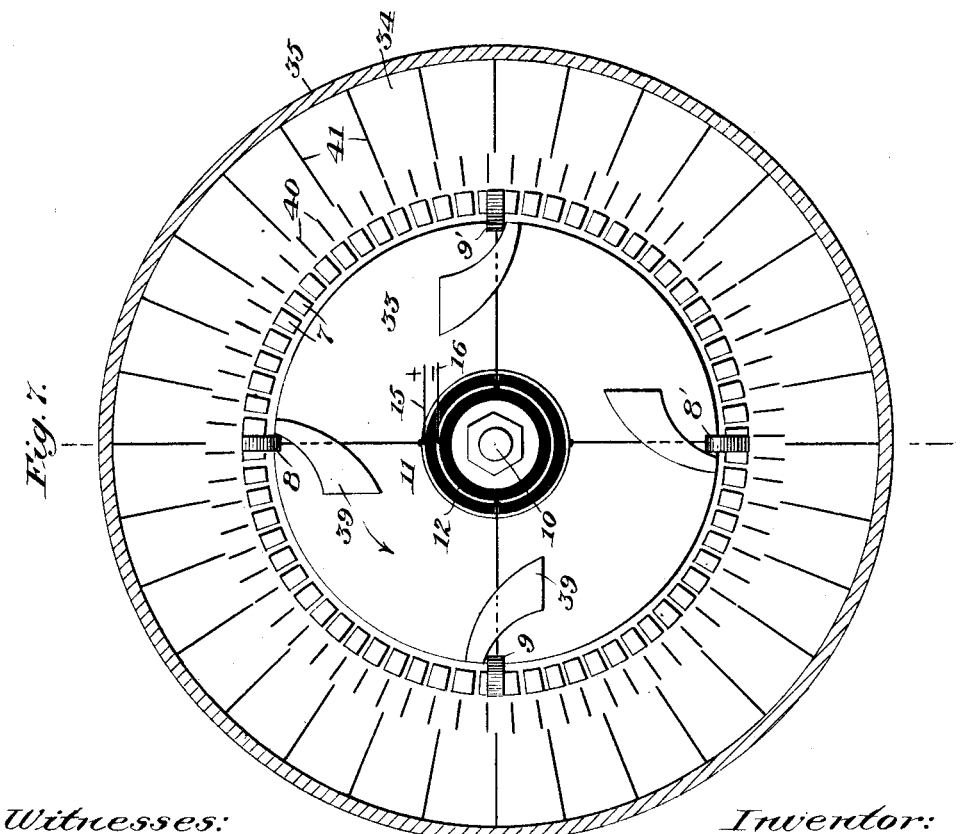
Witnesses:
Inventor:

UNITED STATES PATENT OFFICE.

CARL G. KOPPITZ, OF YOUNGSTOWN, OHIO.

APPARATUS FOR INTERCONVERTING HIGH-POTENTIAL POLYPHASE AND DIRECT ELECTRIC CURRENTS.

1,183,881.   Specification of Letters Patent.   Patented May 23, 1916.

Application filed August 31, 1911. Serial No. 646,988.

*To all whom it may concern:*

Be it known that I, CARL G. KOPPITZ, a citizen of the United States, residing at Youngstown, in the county of Mahoning and State of Ohio, have invented certain new and useful Improvements in Apparatus for Interconverting High-Potential Polyphase and Direct Electric Currents, of which the following is a specification.

This invention relates especially to apparatus for the interconversion of alternating and direct currents of sufficiently high potential to permit unidirectional currents to be transferred as arcs between the separated fixed segments and revolving brushes of a collector, for example currents having a potential of from ten or twenty thousand up to several hundred thousand volts.

The invention involves the flow of polyphase currents to or from and through a fixed winding, and the flow of direct currents to or from the collector-brushes, pulses of direct current jumping across the spaces of direct current jumping across the spaces between these brushes and fixed segments connected by spaced leads to different portions of a closed winding in inductive relations to or included in the polyphase circuits. The segments and brushes are preferably cooled and the arcs extinguished by blasts of pre-cooled non-oxidizing gas, caused to impinge upon them by fans carried by the brushes, the portions of gas heated by the several arcs being electrically insulated as they flow away from the segments and being delivered to a separate cooler.

In the accompanying drawing Figure 1 is a diagrammatic view of the electrical features of a three-phase converter having separate transformer windings for polyphase and direct current, and two collector-brushes of opposite polarity; Fig. 2 is a similar view of a three-phase converter having a single auto-transformer winding, subdivided into two windings connected in parallel for each phase, and provided with two pairs of collector-brushes, connected in parallel; Fig. 3 is a side elevation, partly in axial section, of a current-collector driven by a direct-current motor, for use in converting direct into alternating current; Fig. 4 is a side elevation, partly in section, of a current-collector driven by a synchronous motor, with current-controlled means for varying the angular position of the brushes, for use in converting or rectifying alternating into direct current; Fig. 5 is a side elevation, partly in section, of a collector the brushes of which are driven jointly by a direct-current motor and a synchronous motor, with centrifugal brush-adjusting mechanism, for use in converting direct into alternating current or the reverse; Fig. 6 illustrates the same converter as Fig. 5, but provided with hand-operated brush-adjusting mechanism; and Figs. 7 and 8 are transverse vertical sections, in planes at right angles to each other, of the complete current-collecting mechanism.

The converter shown in Fig. 1 comprises a three-phase transformer having delta-connected concentric closed windings 1, 2, the winding 1 having external leads 3, 4, 5, and the winding 2 having a series of spaced leads 6 extending to a circular row of separated commutator segments 7. Concentric to but spaced away from the segments are two brushes 8, 9, of opposite polarity, which are carried by a central revolving shaft 10. Upon this shaft and insulated therefrom are two collector-rings 11, 12, respectively connected to the brushes 8, 9 by wires 13, 14. Fixed brushes 15, 16, for receiving or delivering direct current, bear on these rings. The outer winding 1 may be omitted and the polyphase leads 3, 4, 5 delta-connected to the remaining winding 2, as indicated by the dotted lines 17, this winding then acting as an auto-transformer.

In the converter shown in Fig. 2 a single closed auto-transformer winding 18 is subdivided into six equal portions, opposite pairs of which are delta-connected in parallel to the three external polyphase leads 3, 4, 5, spaced leads 6′ also extending from different portions of the winding to the commutator segments 7. Two pairs of oppositely-disposed brushes 8, 8′ and 9, 9′ are carried by a central revolving shaft 10′, the opposite brushes being of like polarity and the two pairs being respectively connected in parallel to collecting-rings 11′, 12′, on which bear brushes 15′, 16′.

The converter illustrated in Fig. 3 is of the simplest type, the collector-brushes 8, 9 being supplied with direct current from an external source through the rings 11, 12 and being driven by a motor 19 of any desired type, here shown as a direct-current electric motor. Successive pulses of unidirectional current jump from the brushes 8, 9 to the segments 7, across the intervening air-gaps, being thence carried by the leads 6 to the transformer windings connected to, or in inductive relation to, a circuit to be supplied with polyphase current, for example the winding 2 of Fig. 1, or 18 of Fig. 2.

The converter shown in Fig. 4 is designed to convert alternating into direct current, only. Polyphase current is simultaneously supplied to the transformer windings, e. g., 1 or 18, and to a synchronous motor 20 driving the brushes 8, 9. These brushes are thereby caused to rotate in synchronism with the current supplied to the transformer. Means is also provided for shifting the angular position of the brushes relative to the phases or waves of current, to vary the potential of the direct current delivered from the transformer Figs. 1 and 2 by the leads 6 to the segments 7 and thence, arcing across the intervening spaces, to the brushes 8, 9 and rings 11, 12. The means here illustrated comprises two alined adjacent shafts 21, 22, one, 21, driven by the synchronous motor 20, and the other, 22, driving the brushes. The adjacent ends of these shafts are loosely inclosed by a sleeve 23, which can be shifted longitudinally by a ring 24 and lever 25. This sleeve is coupled to the shaft 21 by an alined spline 26, and to the shaft 22 by an inclined spline 27. The lever 25 is connected at its outer end to a tension spring 28 tending to move the sleeve 23 in one direction, and to the core 29 of a solenoid 30, tending to move it in the other direction. This solenoid is energized by the direct current supplied to or delivered from the converter or rectifier, Fig. 4, being preferably in circuit with the external direct-current leads connected thereto, not shown. The voltage of the direct current delivered by the converter or rectifier is thereby maintained substantially uniform regardless of the consumption of current, a decreased consumption of current acting to shift the brushes to phase- or wave-positions of lower voltage and thereby decrease the potential of the current delivered to the rings, and thereby counteract the increase in voltage ordinarily experienced when the load on a circuit is reduced.

The apparatus shown in Fig. 5 is designed to convert either alternating into direct or direct into alternating current. The brushes 8, 9 are primarily driven by any motor 19' on the shaft 21', that shown being a direct-current motor. The armature of a synchronous motor 20' is also fixed on this shaft, its windings being in circuit with the polyphase transformer winding, e. g., 1 or 18. The commutator segments 7 are severally connected by leads 6 to the direct-current transformer winding, e. g., 2 or 18, said polyphase- and direct-current windings being either separate windings in inductive relation, as shown in Fig. 1, or being the same auto-transformer winding, as in Fig. 2. The angular position of the brushes 8, 9 is here also controlled by a sliding sleeve 23 engaging with an alined spline 26 on the shaft 21' and an inclined spline 27 on the shaft 22'. The movement of the sleeve and adjustment of the brushes is automatically effected by a centrifugal governor 31, which maintains a predetermined fixed relation between the speed of the brushes and their angularity. The motor 19' serves to primarily drive the brushes and the motor 20' serves to hold them in synchronism.

The construction shown in Fig. 6 is precisely the same as that of Fig. 5, except that the sleeve 23 is manually operated by a lever 32, enabling the ratio of the alternating- and direct-current voltages to be varied as desired.

The preferred current-collector is illustrated in detail in Figs. 7 and 8. Its two diametrically-opposite brushes 8, 8' are fixed on a disk 33 of insulating material, carried by and rotating with the shaft 10'' (or 22''). These brushes are connected in parallel to a metal ring 11 carried by an insulating disk fixed on the shaft. Two oppositely-disposed brushes 9, 9', of opposite polarity to the first pair, are also fixed on the disk 33, in positions ninety degrees therefrom, and are connected in parallel to a metal ring 12 carried by another insulating disk fixed on the shaft. Positive and negative brushes 15, 16, respectively, for receiving or delivering the direct current, bear on the rings 11, 12. The commutator segments 7 are secured on a flat ring 34 of insulating material, lying in the plane of the disk 33. The brushes and segments are inclosed by a box, comprising the disk 33 and ring 34, and a circular front-plate 35 of insulating material, with a rim 35' extending over the ring 34. An annular partition 36 extends rearwardly from the front-plate 35, subdividing the box into two concentric chambers. A pipe 37 extending through the plate 35 inside the partition serves to supply a pre-cooled inert or reducing gas, for example carbon monoxid or methane, which flows outward between the segments and brushes around the partition 36 and escapes to a suitable cooler and pump 45 through the pipes 38 outside the partition. Four fans 39, shown as rectangular curved funnels, are secured to the disk 33 in proximity to the brushes, in such position that the rotation of the disk causes the gas in the inner chamber of the box to pass into the wider end of the funnels and be delivered from their narrower ends just behind the brushes. These jets of cool, inert or reducing gas flow through the open spaces between the segments 7 and the brushes and effectively extinguish any arcs which tend to persist after the brushes pass on. The ionized gas heated by the arcs flows outward between radial partitions 40 of fire-proof insulating material, for example mica, vulcabeston or bakelite, secured to the ring 34, being thereby subdivided into electrically-isolated portions, preventing the current from flashing across the segments. Other radial partitions 41 serve to similarly subdivide the heated gas flowing into the outer annular compartment of the box and thence escaping through the pipes 38 to the cooler. In practice, it is found that the arcs jumping between the brushes and segments very slightly burn or oxidize the metal thereof, the current flowing, in amperes, being small on account of the high voltage employed. The brushes may be adjusted inward toward the segments to compensate for any wear by shifting-collars 42 secured on the shaft 10 by setscrews and rotating in contact with opposite sides of an apertured central boss 43 carried by a flanged metal disk 44 secured to the ring 34.

I claim:—

1. An electric converter, comprising a winding, an alternating-current circuit in operative relation to said winding, a group of commutator segments, spaced leads from said winding to said segments, and revoluble direct-current brushes spaced away from said segments.

2. An electric converter, comprising a winding, an alternating-current circuit in operative relation to said winding, a group of commutator segments, spaced leads from said winding to said segments, brushes spaced away from said segments, and means for relatively moving said brushes and segments in time-relation to the currents in said winding.

3. An electric converter, comprising a winding, an alternating-current circuit in operative relation to said winding, a group of commutator segments, spaced leads from small successive portions of said winding to said segments, brushes spaced away from said segments, and means for relatively moving said brushes and segments in time-relation to the currents in said winding.

4. An electric converter, comprising a winding, a polyphase-current circuit in operative relation to said winding, a group of commutator segments, spaced leads from successive phase-portions of said winding to said segments, brushes spaced away from said segments, and means for relatively moving said segments and brushes in synchronism with the currents in said winding.

5. An electric converter, comprising a winding, an alternating-current circuit in operative relation to said winding, a group of commutator segments, spaced leads from said winding to said segments, brushes spaced away from said segments, means for relatively moving said brushes and segments in time-relation to the currents in said winding, and means for extinguishing arcs between said segments and brushes.

6. An electric converter, comprising a winding, an alternating-current circuit in operative relation to said winding, a group of commutator segments, spaced leads from said winding to said segments, revoluble direct-current brushes spaced away from said segments, and means for extinguishing arcs between said segments and brushes.

7. An electric converter, comprising a winding, an alternating-current circuit in operative relation to said winding, a group of commutator segments, spaced leads from said winding to said segments, revoluble direct-current brushes spaced away from said segments, and means for projecting gas-currents onto said segments in proximity to said brushes.

8. An electric converter, comprising a closed winding, polyphase-current circuits in operative relation to said winding, a group of commutator segments, spaced leads from said winding to said segments, direct-current brushes spaced away from said segments, and means for revolving said brushes in synchronism with the polyphase currents.

9. An electric converter, comprising a closed winding, polyphase-current circuits in operative relation to said winding, a group of commutator segments, spaced leads from said winding to said segments, revoluble direct-current brushes spaced away from said segments, and a synchronous motor driven by the polyphase currents and driving said brushes.

10. An electric converter, comprising a closed winding, polyphase-current circuits in operative relation to said winding, a group of commutator segments, spaced leads from said winding to said segments, revoluble direct-current brushes spaced away from said segments, a synchronous motor driven by the polyphase currents and driving said brushes, and means for shifting the angular position of said brushes.

11. An electric converter, comprising a closed winding, polyphase-current circuits in operative relation to said winding, a group of commutator segments, spaced leads from said winding to said segments, revoluble direct-current brushes spaced away from said segments, a synchronous motor driven by the polyphase currents and driving said brushes, and automatic means for shifting the angular position of said brushes.

12. An electric converter, comprising a closed winding, polyphase-current circuits in operative relation to said winding, a group of commutator segments, spaced leads from said winding to said segments, revoluble direct-current brushes spaced away from said segments, a synchronous motor driven by the polyphase currents and driving said brushes, and current-responsive means for shifting the angular position of said brushes.

13. An electric converter, comprising a closed winding, polyphase-current circuits in operative relation to said winding, a group of commutator segments, spaced leads from said winding to said segments, revoluble direct-current brushes spaced away from said segments, a synchronous motor driven by the polyphase currents and driving said brushes, and current-responsive means in one of the converter circuits for shifting the angular position of said brushes.

14. An electric converter, comprising a closed winding, polyphase-current circuits in operative relation to said winding a group of commutator segments, spaced leads from said winding to said segments, direct-current brushes spaced away from said segments, a revoluble shaft carrying said brushes, two motors on said shaft, one of said motors being a non-synchronous driving motor and the other being a synchronous driving and regulating motor energized by the polyphase currents, and means for shifting the angular position of said brushes.

15. An electric converter, comprising a closed winding, polyphase-current circuits in operative relation to said winding, each phase-circuit comprising two or more windings connected in parallel, a group of commutator segments, spaced leads from said winding to said segments, and two or more pairs of revoluble direct-current brushes spaced away from said segments, each pair of brushes being connected in parallel.

16. An electric-current collector, comprising a group of segments, a brush or brushes, said segments and brushes relatively revoluble, and means for subdividing and separating the current of heated gases flowing away from said segments.

17. An electric-current collector, comprising a group of segments, a brush or brushes, said segments and brushes relatively revoluble, and radial partitions arranged to subdivide and separate the current of heated gases flowing away from said segments.

18. An electric-current collector, comprising a group of open-spaced segments, a revoluble brush or brushes adjacent to but spaced away from said segments, and radial partitions for separating the heated gases flowing away from said segments.

19. An electric-current collector, comprising a group of segments, a brush or brushes, said segments and brushes relatively revoluble, means for projecting gas-currents onto said segments in proximity to said brushes, and means for separating the heated gases flowing away from said segments.

20. An electric-current collector, comprising a group of open-spaced segments, a revoluble brush or brushes adjacent to but spaced away from said segments, fans in proximity to and revoluble with said brushes, and radial partitions for separating the heated gases flowing away from segments.

In testimony whereof I affix my signature in presence of two witnesses.

CARL G. KOPPITZ.

Witnesses:
H. L. PATTERSON,
H. CLAY STIER.

Copies of this patent may be obtained for five cents each, by addressing the "Commissioner of Patents, Washington, D. C."